United States Patent Office 3,337,398
Patented Aug. 22, 1967

3,337,398
METHOD OF KILLING MICROORGANISMS
Lemont B. Kier, Worthington, Ohio, assignor to The Ohio State University, Columbus, Ohio, an institution of Ohio
No Drawing. Filed Nov. 12, 1965, Ser. No. 507,582
7 Claims. (Cl. 167—33)

The present invention relates to antibiotic activity, and is more particularly concerned with a method of killing microorganisms by means of mesoionic 1,3,4-thiadiazoles.

Considerable uncertainty exists with regard to the exact electronic structure of the mesoionic compounds. In fact, these compounds are generally defined in terms of what they are not rather than of what they are. For example, a mesoionic compound may be defined as an aromatic heterocyclic compound for which no uncharged covalently bonded structure may be drawn.

The most widely accepted explanation of the structure of the mesoionic compounds, and the 1,3,4-thiadiazoles in particular, is that advanced in 1938 by A. Schöenberg, J. Chem. Soc., 1938, 824, who represented the compounds as resonance hybrids.

The question of proper nomenclature for the mesoionic compounds is still somewhat unsettled. The present nomenclature has been selected and modified from the papers by Doering and Knox, J. Am. Chem. Soc., 74, 5686 (1952), and by Katritzky, Chem. and Ind. (London), 1955, 521. The pentagonal skeleton of the molecule is represented as usual and the aromatic sextet is represented by an inscribed circle. The positive charge in association with the sextet of pi electrons is represented by a "plus" (+) sign in the center of the inscribed circle. The negative charge residing on the exocyclic sulfur atom is represented by a "minus" (−) sign located near the atom. These symbols are not intended to represent unit charges, but to indicate counterbalancing charges. The described structure is considered a fully satisfactory and expedient simplification for the present purposes. The numbering for the atoms comprising the ring is conventional. Patterson, A. M., Capell, L. T., and Walker, D. F., "The Ring Index," 2nd ed., Am. Chem. Soc., Washington, D.C., 1960, p. 5.

It is accordingly an object of the present invention to provide a method for killing microorganisms which comprises contacting said microorganisms with a compound having the formula:

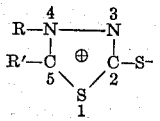

wherein R is selected from the group consisting of phenyl, lower-alkylphenyl, lower-alkoxyphenyl, halophenyl, trifluoromethylphenyl, and hydroxyphenyl, and
wherein R' is selected from the group consisting of methyl, ethyl, propyl, and isopropyl.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower-alkoxy" has the formula −0 lower-alkyl. When halogen is referred to herein, preferably but not necessarily a halogen of atomic weight in excess of nineteen but not greater than eighty is employed. Of the halogens, chlorine is preferred.

The compounds utilized in the present invention are prepared by first reacting phenylhydrazine or a suitably substituted phenylhydrazine with carbon disulfide, and further reacting the product to form a potassium phenyldithiocarbazinate. The compound thus prepared is subsequently reacted with a suitable acid chloride to form the desired mesoionic 1,3,4-thiadiazole.

The following preparations are given by way of illustration only and are not to be construed as limiting.

*Preparation 1.*—Synthesis of potassium phenyldithiocarbazinate.

Utilizing a large beaker at room temperature, phenylhydrazine (32 gm., approx. 0.29 mole) was dissolved in 350 ml. of absolute ethanol and carbon disulfide (24 gm., approx. 0.31 mole) added with stirring. A precipitate of the phenylhydrazinium salt of phenyldithiocarbazinic acid formed rapidly with a slight evolution of heat. The mixture was allowed to cool and a solution of 17 gm. (approx. 0.31 mole) of potassium hydroxide in 120 ml. of absolute ethanol was added. The initial precipitate dissolved to produce an orange solution which shortly began to deposite a voluminous precipitate of potassium phenyldithiocarbazinate. After 10 minutes, 100 ml. of anhydrous ethyl ether were added and the mixture stirred. The mixture became gray or blue, but on refrigeration at −5° for 30 minutes becomes white or pale yellow. The white solid was filtered off, washed with 300 ml. of anhydrous ethyl ether, and collected. The precipitate was dried in vacuo at room temperature. The yield, based on the over-all reaction scheme, varied from 75 to 88 percent. The reaction product was a white to cream-colored solid, having a melting point of 144-6° C. (dec.), soluble in water, p-dioxane, dimethylformamide and tetrahydrofuran. It was insoluble in ethanol, ethyl ether, hexane, benzene and toluene.

Utilizing the method of Preparation 1, the following compounds are prepared from the stated ingredients:

*Preparation 2.*—Potassium 4 - methylphenyldithiocarbazinate from 4-methylphenylhydrazine.

*Preparation 3.*—Potassium 2 - chlorophenyldithiocarbazinate from 2-chlorophenylhydrazine.

*Preparation 4.*—Potassium 3 - trifluoromethyldithiocarbazinate from 3-trifluoromethylphenylhydrazine.

*Preparation 5.*—Potassium 4 - ethoxyphenyldithiocarbazinate from 4-ethoxyphenylhydrazine.

*Preparation 6.*—Potassium 2 - hydroxyphenyldithiocarbazinate from 2-hydroxyphenylhydrazine.

The following examples are given by way of illustration only and are not to be construed as limiting.

EXAMPLE 1

*Anhydro-4-phenyl-5-methyl-2-thio-1-thia-3,4-diazolinium thiol*

Potassium phenyldithiocarbazinate (44.4 gm.) was suspended in 500 ml. of anhydrous ethyl ether. The stirred suspension was warmed to 40° C. and acetyl chloride (15.7 gm.) was added. The rate of addition of the acid chloride was adjusted to maintain a slow reflux. The mixture was allowed to cool, filtered, and the precipitate washed with distilled water. The ethyl ether fraction contained only a negligible amount of desired product and was therefore discarded. The precipitate was dried and recrystallized from ethanol to give a lemon-yellow crystalline powder.

Table I below lists the yield and physical properties of the reaction product obtained:

TABLE I.—SUMMARY OF PROPERTIES OF ANHYDRO-4-PHENYL-5-METHYL-2-THIO-1-THIA-3,4 - DIAZOLINIUM THIOL

Physical properties:
- Appearance _____ Yellow crystals.
- Molecular formula _____ $C_9H_8N_2S_2$.
- Molecular weight (calculated) __ 208.31.
- Melting point (dec.) _____ 219–21°.
- Literature melting point (1) ____ 216°.
- Recrystallization solvent _____ Ethanol.
- Yield, percent _____ 81.6.

*Analytical.*—Calculated: carbon, 51.89%; hydrogen, 3.87%; nitrogen, 13.45%; sulfur, 30.79%. Found: carbon, 51.86%; hydrogen, 3.73%; nitrogen, 13.60%; sulfur, 30.00%.

Solubility:
- Insoluble _____ Water; 10 percent HCl.
- Slightly soluble ____ Hexane; $CCl_4$; $Et_2O$; p-dioxane.
- Soluble _____ Acetone; abs. EtOH; tetrahydrofuran; EtOAc; 10 percent aq. KOH (pale orange solution, slowly darkens).
- Very soluble _____ $CHCl_3$; dimethylformamide; $H_2SO_4$; HCl (reacts with both acids, colorless solutions).

Spectral data:
Ultra-violet maxima $\lambda^{EtOH}_{Max.}$ $=353\ m\mu(\epsilon=3,055)$
$=261\ m\mu(\epsilon=12,026)$

EXAMPLE 2

Utilizing the method of Example 1, Anhydro-4-phenyl-5-ethyl-2-thio-1-thia-3,4-diazolinium thiol was obtained from potassium phenyldithiocarbazinate and propionyl chloride.

Table II below lists the yield and physical properties of the reaction product obtained:

TABLE II.—SUMMARY OF PROPERTIES OF ANHYDRO-4-PHENYL-5-ETHYL-2-THIO-1-THIA - 3,4 - DIAZOLINIUM THIOL

Physical properties:
- Appearance _____ Pale orange crystals.
- Molecular formula _____ $C_{10}H_{10}N_2S_2$.
- Molecular weight (calculated) ____ 222.33.
- Melting point _____ 191–2°.
- Recrystallization solvent _____ Ethanol.
- Yield, percent _____ 5.2.

*Analytical data.*—Calculated: carbon, 54.02%; hydrogen, 4.53%; nitrogen, 12.60%; sulfur, 28.84%. Found: carbon, 53.84%; hydrogen, 4.60%; nitrogen, 12.43%; sulfur, 28.96%.

Solubility:
- Insoluble _____ Hexane; water; 10 percent HCl.
- Slightly soluble ____ $CCl_4$; $Et_2O$; abs. EtOH; 10 percent. aq. KOH.
- Soluble _____ p-Dioxane; EtOAc.
- Very soluble _____ $CHCl_3$; acetone; dimethylformamide; tetrahydrofuran; HCl; $H_2SO_4$ (reacts with both acids to give colorless solutions).

Spectral data:
Ultra-violet maxima $\lambda^{EtOH}_{Max.}$ $=356\ m\mu(\epsilon=3,140)$
$=261\ m\mu(\epsilon=11,531)$

EXAMPLE 3

Utilizing the method of Example 1, Anhydro-4-phenyl-5-propyl-2-thiol-1-thia-3,4-diazolinium thiol was prepared from potassium phenyldithiocarbazinate and butyryl chloride.

Table III below lists the yield and physical properties of the reaction product obtained:

TABLE III.—SUMMARY OF PROPERTIES OF ANHYDRO-4-PHENYL - 5 - n - PROPYL-2-THIO-1-THIA-3,4-DIAZOLINIUM THIOL

Physical properties:
- Appearance _____ Pale yellow fibers.
- Molecular formula _____ $C_{11}H_{12}N_2S_2$.
- Molecular weight (calculated) __ 236.37.
- Melting point _____ 162–3°.
- Recrystallization solvent _____ Ethanol.
- Yield, percent _____ 51.7.

*Analytical data.*—Calculated: carbon, 55.90%; hydrogen, 5.12%; nitrogen, 11.85%; sulfur, 27.13%. Found: carbon, 55.82%; hydrogen, 5.22%; nitrogen, 11.67%; sulfur, 27.21%.

Solubility:
- Insoluble _____ Hexane; water; 10 percent HCl; 10 percent aq. KOH.
- Slightly soluble ____ $CCl_4$; $Et_2O$.
- Soluble _____ Abs. EtOH; EtOAc.
- Very soluble _____ $CHCl_3$; acetone; p-dioxane (solution darkens); dimethylformamide, tetrahydrofuran; HCl; $H_2SO_4$ (reacts with both acids to give colorless solutions).

Spectral data:
Ultra-violet maxima $\lambda^{EtOH}_{Max.}$ $=358\ m\mu(\epsilon=3,361)$
$=261\ m\mu(\epsilon=11,819)$

EXAMPLE 4

Utilizing the method of Example 1, Anhydro-4-phenyl-5-isopropyl-2-thio-1-thia-3,4-diazolinium thiol was prepared from potassium phenyldithiocarbazinate and isobutyryl chloride.

Table IV below lists the yield and physical properties of the reaction product obtained:

TABLE IV.—SUMMARY OF PROPERTIES OF ANHYDRO-4-PHENYL-5-ISOPROPYL-2-THIO - 1 - THIA-3,4-DIAZOLINIUM THIOL

Physical properties:
- Appearance _____ Lemon yellow crystals.
- Molecular formula _____ $C_{11}H_{12}N_2S_2$.
- Molecular weight (calculated) ____ 236.37.
- Melting point _____ 133–6°.
- Recrystallization solvent _____ Ethanol.
- Yield, percent _____ 7.0.

*Analytical data.*—Calculated: carbon, 55.90%; hydrogen, 5.12%; nitrogen, 11.85%; sulfur, 27.13%. Found: carbon, 55.98%; hydrogen, 5.21%; nitrogen, 11.79%; sulfur, 27.26%.

Solubility:
    Insoluble _____ Hexane; water; 10 percent HCl.
    Slightly soluble ____ CCl₄; Et₂O; abs. EtOH; EtOAc.
    Soluble _____ Acetone; p - dioxane; HCl (reacts, colorless solution); 10 percent aq. KOH (reacts, colorless solution).
    Very soluble _____ CHCl₃; tetrahydrofuran; dimethylformamide; H₂SO₄ (reacts, colorless solution).

Spectral data:
    Ultra-violet maxima $\lambda_{Max.}^{EtOH}$

=358 mμ(ε=3,442)
=261 mμ(ε=10,926)

Utilizing the method of Example 1, the following compounds are prepared from the stated ingredients:

Anhydro - 4 - (4-methylphenyl)-5-methyl-2-thio-1-thia-3,4-diazolinium thiol from potassium 4-methylphenyldithiocarbazinate and acetyl chloride.

Anhydro - 4 - (2 - chlorophenyl) - 5 - methyl-2-thio-1-thia-3,4-diazolinium thiol from potassium 2-chlorophenyldithiocarbazinate and acetyl chloride.

Anhydro - 4 - (3 - trifluoromethylphenyl) - 5 - methyl-2-thio-1-thia-3,4-diazolinium thiol from potassium 3-trifluoromethylphenyldithiocarbazinate and acetyl chloride.

Anhydro - 4 - (2 - hydroxyphenyl) - 5 - methyl-2-thio-1-thia-3,4-diazolinium thiol from potassium 2-hydroxyphenyldithiocarbazinate and acetyl chloride. The corresponding 2-ethoxy compound is prepared from the corresponding 2-ethoxy starting material of Preparation 5.

*Microbiological screening*

The microorganisms selected for screening were two Gram-positive cocci, *Staphylococcus aureus* and *Diplococcus pneumoniae*. The organisms were cultured in a Difco nutrient broth and incubated at 37° for 48 hours prior to use. Absorbent paper disks 12.7 mm. in diameter were saturated with a concentrated solution of the meso-ionic compound in dimethyl sulfoxide. The disks were sterilized in a hot air oven for 60 minutes at 60° and stored in sterile petri dishes. A standard brain heart infusion agar was used as the medium for sensitivity tests. The test medium was of the following composition:

|   | Grams |
|---|---|
| Calf brain, infusion from | 200.0 |
| Beef heart, infusion from | 250.0 |
| Proteose peptone (Difco) | 10.0 |
| Bacto-dextrose | 2.0 |
| Sodium chloride | 5.0 |
| Disodium phosphate | 2.5 |
| Bacto-agar | 15.0 |

The medium was autoclaved at 120° for 20 minutes for sterilization. The medium was then poured into sterile petri dishes, flamed and allowed to cool.

The sterile agar medium was streaked with the test organism using a chromium loop. The test disk was applied using standard aseptic technique. The sensitivity is measured as a zone of inhibition of growth around the test disk. Penicillin G potassium was used as the reference standard for the cocci, giving a zone of inhibition defined as "4." A blank disk saturated with dimethyl sulfoxide was used as a control, giving a zone of inhibition defined as "0." The plates were observed for sensitivity to the various compounds at 24 and 48 hours after inoculation. The maximum inhibition did not change after 24 hours. Therefore, only one value is reported for each compound for a given organism.

The results of the sensitivity tests are shown in Table V below:

TABLE V.—SENSITIVITY OF MICROORGANISMS TO MESO-IONIC 1,3,4-THIADIAZOLES

| Compound Designation | S. aureus 24 hours | D. pneumoniae 24 hours |
|---|---|---|
| Example 1 | 4 | 3 |
| Example 2 | 4 | 3 |
| Example 3 | 4 | 3 |
| Example 4 | 4 | 3 |

The compounds of the invention may be utilized for killing microorganisms in many different ways. For example the compounds may be dissolved or suspended in a suitable solvent such as alcohol, chloroform, ether, acetone, etc., and utilized by adding to laundry solutions, sprayed from an aerosol container, or applied generally by any suitable means. The compounds may also be compounded with suitable carriers, as for example oils such as sesame or peanut oil. The compounds may be compounded as ointments or lotions for topographical use with common materials, as in Carbowax (polypropylene glycol), tragacanth or methyl cellulose suspensions. They may be used to kill microorganisms on clothing, furniture, floors, utensils, and in public areas such as locker rooms and lavatories.

*Pharmacological screening*

The compounds of Examples 1–4 were tested by means of standard pharmacological tests utilizing the following procedure:

Dublin ICR male albino mice, weighing 20 to 30 gm., were used in all experiments. The animals were singly caged with water and a complete ration rat-mouse chow provided ad libitum. Four mice were used for each of the four compounds. Animals were given a dose of 500 mg./kg. by intraperitoneal injection of a suspension of the compound in 5 percent aqueous polyvinylpyrrolidone. The concentration of the suspension was 500 mg./10ml. which gave an injection volume of 0.25 ml. for a 25 gm. mouse.

In an attempt to determine the approximate range of acute toxicity of the compounds, the animals were injected and mortality recorded at 72 hours. Observations for changes in activity were made continually for one hour after injection. If no activity was observed within five to ten minutes, the animals were only observed cursorily at indefinite intervals during the hour after injection. For animals exhibiting unusual behavior, the period of observation was continuous for one hour after injection or from the first indication of compound activity.

Of the compounds tested, all indicated a low order of acute intraperitoneal toxicity in mice. The acute medium lethal dose was found to be greater than 500 mg./kg. for the four compounds tested.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A method of killing undesirable Staphylococcus or Diplococcus microorganisms, which comprises contacting said organisms with an effective amount of a compound having the formula:

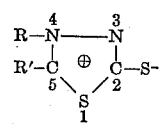

wherein R is selected from the group consisting of phenyl, lower-alkylphenyl, lower-alkoxyphenyl, halophenyl, trifluoromethylphenyl, and hydroxyphenyl, and wherein R' is selected from the group consisting of methyl, ethyl, propyl, and isopropyl.

2. A method according to claim 1 wherein said compound is anhydro-4-phenyl-5-methyl-2-thio-1-thia-3,4-diazolinium thiol.

3. A method according to claim 1 wherein said compound is anhydro-4-phenyl-5-ethyl-2-thio-1-thia-3,4-diazolinium thiol.

4. A method according to claim 1 wherein said compound is anhydro-4-phenyl-5-propyl-2-thio-1-thia-3,4-diazolinium thiol.

5. A method according to claim 1 wherein said compound is anhydro-4-phenyl-5-isopropyl-2-thio-1-thia-3,4-diazolinium thiol.

6. A method according to claim 1 wherein said microorganism is *Staphylococcus aureus*.

7. A method according to claim 1 wherein said microorganism is *Diplococcus pneumoniae*.

References Cited

Stewart et al.: Nature, vol. 204, Nov. 14, 1964, p. 697.

ALBERT T. MEYERS, *Primary Examiner.*

JEROME D. GOLDBERG, *Assistant Examiner.*